United States Patent [19]

Baker

[11] 4,108,810

[45] Aug. 22, 1978

[54] METHOD FOR MAKING CROSSLINKED RESIN FOAMS FROM AT LEAST ONE DICARBOXYLIC ACID, AT LEAST ONE ETHYLENICALLY UNSATURATED DICARBOXYLIC ACID ANHYDRIDE AND A POLYISOCYANATE

[75] Inventor: Ann Marie Baker, Midland, Mich.

[73] Assignee: The Dow Chemical Company, Midland, Mich.

[21] Appl. No.: 843,015

[22] Filed: Oct. 17, 1977

[51] Int. Cl.$^2$ .............................. C08J 9/00; C08J 9/08
[52] U.S. Cl. ................................. 521/129; 521/156; 521/157; 528/75
[58] Field of Search ..... 260/2.5 AM, 2.5 N, 77.5 AM

[56] References Cited

U.S. PATENT DOCUMENTS

| 3,249,561 | 5/1966 | Hendrix | 260/2.5 AM |
|---|---|---|---|
| 3,300,420 | 1/1967 | Frey | 260/2.5 AM |
| 3,310,506 | 3/1967 | Amborski et al. | 260/2.5 N |
| 3,380,964 | 4/1968 | Grundschober et al. | 260/47 CB |
| 3,406,148 | 10/1968 | Sambeth et al. | 260/47 CB |
| 3,479,305 | 11/1969 | Kus et al. | 260/2.5 AM |
| 3,483,144 | 12/1969 | Lavin et al. | 260/2.5 AM |
| 3,489,696 | 1/1970 | Miller | 260/2.5 AM |
| 3,533,996 | 10/1970 | Grundschober et al. | 260/47 CB |
| 3,554,939 | 1/1971 | Lavin et al. | 260/2.5 AM |
| 3,562,189 | 2/1971 | Farrissey et al. | 260/2.5 AM |
| 3,620,987 | 11/1971 | McLaughlin et al. | 260/2.5 N |
| 3,644,234 | 2/1972 | Grieve | 260/2.5 AM |
| 3,772,216 | 11/1973 | Rosser | 260/2.5 AM |
| 3,890,272 | 6/1975 | D'Alelio | 260/47 UA |
| 4,001,149 | 1/1977 | Scaggs | 260/2.5 FP |
| 4,008,186 | 2/1977 | Scaggs | 260/2.5 FP |
| 4,016,114 | 4/1977 | Gruffaz et al. | 260/2.5 N |
| 4,057,518 | 11/1977 | Angleraud et al. | 260/2.5 N |

FOREIGN PATENT DOCUMENTS 2,517,106 10/1975 Fed. Rep. of Germany ....... 260/2.5 N

*Primary Examiner*—M. J. Welsh

[57] ABSTRACT

Storage-stable solid intermediate products, capable of being foamed and polymerized to cellular highly crosslinked three dimensional ethylenic polymer resin products having amic acid groups and/or cyclic imide linkages, are obtained by inter-reacting, at temperature above the melting point but below about 100° C, a polyisocyanate illustrated by tolylene diisocyanate, a dicarboxylic acid illustrated by maleic or malonic acid, and an unsaturated dicarboxylic acid anhydride illustrated by maleic anhydride, subsequently adding catalyst, surfactant and water while allowing $CO_2$ to evolve, finally allowing the reaction mixture to solidify. The stable solid, e.g. in the form of granules or powder, can subsequently be shaped, foamed and polymerized by heating to 150°–300° C to provide infusible, insoluble, flame-resistant, rigid cellular resin products having low apparent density.

10 Claims, No Drawings

METHOD FOR MAKING CROSSLINKED RESIN FOAMS FROM AT LEAST ONE DICARBOXYLIC ACID, AT LEAST ONE ETHYLENICALLY UNSATURATED DICARBOXYLIC ACID ANHYDRIDE AND A POLYISOCYANATE

BACKGROUND OF THE INVENTION

This invention concerns cellular highly crosslinked, three dimensional ethylenic polymer resins having amic acid and/or cyclic imide linkages including (but not limited to) those having polymeric structure illustrated by the formula:

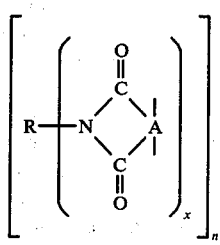

(Formula I)

wherein R is a divalent organic radical having $x$ valence bonds on different carbon atoms, A is a tetravalent organic radical having a first pair of valences on vicinal carbon atoms attached to carbonyl groups and a second pair of valences on vicinal carbon atoms forming part of the polymer chain and arising by addition polymerization of a C=C ethylenic double bond in the monomeric form of A, $x$ is a small number at least 2, and $n$ is a large number. Such resin has carbon-to-carbon ethylenic polymer chains and multiple imide crosslinkages. A polymerized N,N'-bis-maleimide of a diamine is an example of such resin where $x$ is 2 and A is

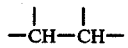

in Formula I. Amic acid resins have the group:

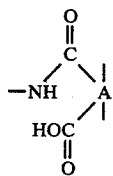

in place of at least some of the imide groups:

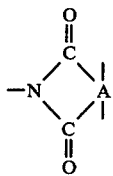

in Formula I.

Resins having structure like that of Formula I where $x$ is 2 (i.e., bis-imide polymers) are known in non-cellular form, but foams of such resins have not heretofore been known. For example, such non-cellular, crosslinked resins from N,N'-bis-maleimides are described in U.S. Pat. Nos. 3,380,964 (F. Grundschober et al.), 3,406,148 (J. Sambeth et al.), 3,533,996 (F. Grundschober et al.), and 3,890,272 (G. F. D'Alelio).

The "polyimide foams" that are known in the art have resin structures different from that of Formula I and include those wherein the imide groups are recurring linkages in the main polymer chain such as those obtained by reaction of a dianhydride of a tetracarboxylic acid, e.g., pyromellitic dianhydride, and a diamine as described in U.S. Pat. Nos. 3,249,561 (W. R. Hendrix), 3,310,506 (L. W. Amborski et al.), 3,483,144 (E. Lavin et al.), and 3,554,939 (E. Lavin et al.). Foams having structures similar to those just mentioned are also made by reaction of a tetracarboxylic acid or dianhydride with a polyisocyanate as described in 3,300,420 (H. E. Frey), 3,479,305 (S. T. Kus et al.), 3,489,696 (G. W. Miller), 3,562,189 (W. J. Farrissey, Jr. et al.), 3,620,987 (A. M. McLaughlin et al.), 3,644,234 (R. L. Grieve), and 3,772,216 (R. W. Rosser et al.). Another kind of foam from resins having "imide" linkages is described in German Offenlegungsschrift No. 25-17-06 by F. Zumstein et al. None of these prior art foam resins has resin polymeric structure like that of Formula I.

It would be desirable if there were method and means to make cellular highly crosslinked ethylenic polymer resins having the general structure of Formula I wherein the foam-forming and resin finishing step could be carried out using a storage-stable foamable resin intermediate.

This invention provides method and means for making such storage-stable foamable resin intermediate and for making therefrom cellular highly crosslinked three dimensional ethylenic polymer resins having amic acid and/or cyclic imide linkages, including (but not limited to) those having structure generally shown in Formula I. It also makes such storage-stable foamable resin intermediate in granular or powdered solid form. Other advantages of the invention are evident in the descriptions that follow.

SUMMARY OF THE INVENTION

This invention provides a method for making cellular, highly crosslinked, three dimensional ethylenic polymer resin bodies having amic acid and/or cyclic imide linkages illustrated by Formula I, as defined, from a storage-stable foamable solid material. Such material, made as described hereinafter, is obtained in granular or powdered solid form and can be held, handled in various ways and shipped without loss of potential to foam and polymerize. When desired, the foamable solid material is foamed in the manner described to the cellular resin state.

The intermediate storage-stable foamable solid material is prepared according to this invention from three initial essential starting materials:

1. At least one organic polyisocyanate, illustrated by 4,4'-methylene-diphenyldiisocyanate;
2. At least one dicarboxylic acid, illustrated by maleic acid and malonic acid; and
3. At least one ethylenically unsaturated dicarboxylic acid cyclic anhydride, illustrated by maleic anhydride. The acid and anhydride react synergistically with the polyisocyanate.

The initial starting materials are mixed together and heated if necessary to initiate their chemical inter-reaction but keeping the temperature below about 100° C. Carbon dioxide is evolved, and, as the vigor of the gas evolution subsides, a catalyst, a surfactant, and a measured amount of water are subsequently added. Gas is allowed to vent from the reaction mixture which subsequently hardens, after which the reaction mixture is cooled. The resulting solid material is then crushed into pieces or ground into granular or powder form.

The chemical structure of the solid material so obtained is now known with certainty. It appears to be primarily a mixture of prepolymers with molecular weights from about 230 to about 1000 with almost all of the ethylenic unsaturation intact and with very little remaining anhydride functionality. Infra-red analysis shows presence of some isocyanate groups, but most prominent are amic acid and cyclic imide groups. The reaction product is different from the reaction products obtained from the same polyisocyanate reacted with either the acid or anhydride alone, and is also different from a mixture of such acid and anhydride reaction products separately prepared before being mixed together.

The new solid intermediate material is indefinitely stable at temperatures below 100° C, e.g. at ordinary warehouse temperature.

When the final cellular resin body is desired, the granular or powdered solid intermediate material is placed in a suitable mold or container and heated to temperature above about 150° C, typically in the range from about 200° to about 300° C, to effect foaming and further polymerization until the rigid resin foam product is obtained.

The final resin product is a rigid, hard foam body which is infusible and insoluble in usual solvents. It glows red in the flame of natural gas burning in air with little or no smoke. The apparent density of the foam product can be varied from about 30 pounds per cubic foot (pcf) down to less than 1 pcf. The cell structure is small and uniform.

DETAILED DESCRIPTION AND EMBODIMENTS

The starting polyisocyanate is any one or mixture of polyisocyanates having the general formula:

R—(NCO)$_x$ (Formula III)

wherein R is an organic radical having "x" valence bonds on different carbon atoms, and x is a small number at least 2, preferably from 2 to about 6 with a preferred average value from 2 to about 3. The polyisocyanates are illustrated by the isomeric tolylene diisocyanates (x=2) and the poly(methylene-phenylene)-polyisocyanates having the general formula:

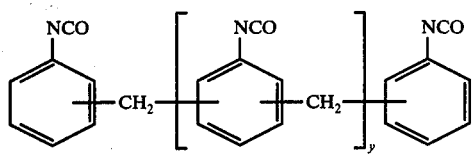

wherein y is an integer from 0 to 4, preferably having an average value from 0 (x=2) to about 1 (x = about 3).

In Formula III, the radical R includes aliphatic, acyclic or cyclic, aromatic, combinations of aliphatic and aromatic, heterocyclic and bridged radicals. When R contains an aromatic ring, the ring is any single or multiple joined, fused or bridged ring system such as

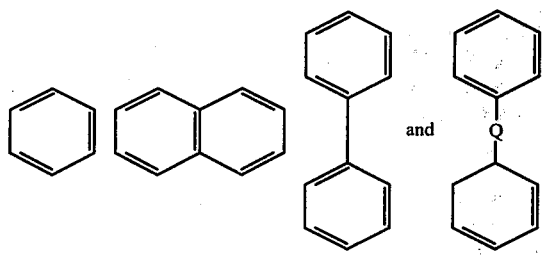

where the rings may be further substituted with alkyl, alkoxy, halo or like non-functional group not reactive with isocyanate or carboxylic anhydride groups, and Q is any bridging atom or group such as methylene or other alkylene having up to four carbon atoms, oxygen, carbonyl, sulfur alone or in sulfoxide or sulfone, or phosphorus in phosphine oxide, phosphite or phosphate, or silicon is silane or siloxane, or tertiary amine nitrogen or the like. Specific examples (for illustration and not to exclude other examples) of such polyisocyanates of Formula III include: tetramethylenediisocyanate, hexamethylenediisocyanate, decamethylenediisocyanate, 1,4-cyclohexylenediisocyante, 1,3-phenylenediisocyanate, 1,4-phenylenediisocyanate, 2,4-tolylenediisocyanate, 2,5-tolylenediisocyanate, 2,6-tolylenediisocyanate; the xylyenediisocyanates, 4,4'-biphenylenediisocyanate, 4,4'-diisocyanato-diphenylether, 4,4'-diisocyanato-diphenylmethane, 2,2-bis(4,4'-diisocyanato-diphenyl) propane, 4,4'-diisocyanato-benzophenone, 1,4-naphthalenediisocyanate, 1,5-naphthalenediisocyanate and 2,4,6-triisocyanato-toluene, and also including mixtures and crude products, such as the commercially available mixtures of 2,4- and 2,6-tolylenediisocyanate (TDI), commercial grade of p,p'-diphenylmethanediisocyanate, and commercial grade of polymethylene polyphenylisocyanate.

The starting dicarboxylic acid can be any one or mixture of dicarboxylic acids including aliphatic cyclic and acyclic, saturated and unsaturated dicarboxylic acids. Specific examples (for illustration and not to exclude other examples) of such dicarboxylic acid include: oxalic acid, malonic acid, methylmalonic acid, succinic acid, methylsuccinic acid, dimethylsuccinic acid, glutaric acid, adipic acid, pimelic acid, cyclobutane-1,2-dicarboxylic acid, cyclohexane-1,2-dicarboxylic acid, maleic acid, fumaric acid, citraconic acid, mesaconic acid, itaconic acid, dimethylmaleic acid, glutaconic acid, tetrahydrophthalic acid, and bicyclo(2.2.1)hept-5-ene-2,3-dicarboxylic acid.

The starting anhydride is any one or mixture of ethylenically unsaturated dicarboxylic acid cyclic anhydrides having the general formula:

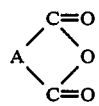 (Formula IV)

Wherein A is a divalent radical containing ethylenic unsaturation, i.e., a C=C double bond, and having the carbonyl groups attached to vicinal carbon atoms, preferably where A is one of the radicals represented by the formulae:

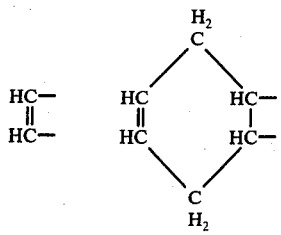

and

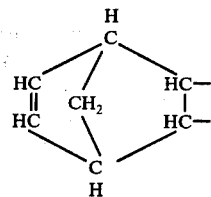

wherein the valences are attached to carbonyl groups. Formula IV includes, for example, maleic anhydride, tetrahydrophthalic anhydride, and bicyclo(2.2.1)hept-5-ene-2,3-dicarboxylic anhydride.

In the initial reaction mixture to form the storage-stable foamable solid intermediate in accordance with this invention, the initial starting materials are generally used in the following proportions:

Not more than about three, preferably from about one to about two, equivalents of polyisocyanate per mole of anhydride [as usual, an equivalent of polyisocyanate is the amount thereof corresponding to one isocyanate (—NCO) group in the polyisocyanate. Thus, the equivalent weight of tolylenediisocyanate (molecular weight 174) is 87 weight units]; and Not more than about 0.5, preferably from about 0.05 to about 0.3, moles of dicarboxylic acid per mole of anhydride.

The starting polyisocyanate, anhydride and dicarboxylic acid are mixed together, usually without added solvent, in a reactor vessel capable of heating, cooling and stirring the contents and venting gas therefrom. The reaction mixture is stirred and heated until the reactants melt together and reaction commences, but below about 100° C, preferably from about 60° to about 95° C. As the first reaction occurs, carbon dioxide evolves. When the first evolution of carbon dioxide subsides, a catalyst and surfactant are added. By "catalyst" herein is meant one which promotes reaction of isocyanates with active hydrogen compounds in accordance with known technology.

Suitable catalysts include alkanolamines such as are disclosed in U.S. Pat. No. 3,772,216 and various tertiary amines such as triethylamine, triethylenediamine, N,N,N',N'-tetramethyl-1,3-butanediamine, various azacyclic compounds such as the N,N-dialkylpiperazines, the various N,N',N''-trialkylaminoalkylhexahydrotriazines and the like. Other suitable catalysts include alkali-metal salts such as lithium ricinoleate, and heavy metal salts such as cobalt naphthenate and tin salts of carboxylic acids, e.g., stannous octoate. The amount of such catalyst depends on the activity of the catalyst; amine catalysts are normally used in the range from about 0.1 to about 10%, preferably from about 1 to about 5%, by weight of the reactants.

Typical surfactants for general use in resin foam technology are known per se as described in "Plastic Foams" by Calvin J. Benning, Vol. 2, pages 320-325. However, because the resin-polymerization and -foaming reaction to which the foamable solid intermediate will later be subjected takes place at relatively high reaction temperature, the selected surfactant is preferably one which is thermally stable at such temperature. For reactions in accord with this invention, the following surfactants were found to be sufficiently stable and effective for the purpose:

| Trade Name | Chemical Description |
| --- | --- |
| Surfynol 104 | tetramethyl decynediol |
| Dowfax 2A1 liq. (45% solids) | Sodium dodecyl-diphenyl-ether-disulfonate |
| Dowfax 3B2 liq. (45% solids) | Sodium n-decyl-diphenyl-ether-disulfonate |
| — | Sodium lauryl sulfate (40% solids) |
| Aerosol A-102 (30% solids) | Disodium ethoxylated alcohol half ester of sulfosuccinic acid |
| Aerosol A-103 (30% solids) | Disodium ethoxylated nonyl phenol half ester of sulfosuccinic acid |
| Alipal EP-110 liq. | Ammonium salt of a sulfate ester of an alkyl-phenoxypoly(ethyleneoxy)-ethanol |
| Alipal EP-120 liq. | Similar to Alipal EP-110 |
| Alipal CO-433 liq. | Sodium salt of a sulfate ester of an alkylphenoxy poly(ethyleneoxy)ethanol |
| F-218 | Cyclic dimethylsiloxane |
| DC-193 | Block copolymer of polysiloxane and polyalkylene oxide |
| DC-200 (100 to 60,000 cs) | Dimethylsiloxane polymers |
| DC-510 (100 to 100,000 cs) | Phenylmethylsiloxane polymers |
| Deriphat 154 | Disodium salt of N-tallow beta-aminodipropionate |
| Ninol AA-62 | Fatty acid alkanolamide |
| Miranol HM | Dicarboxylic lauric derivative, sodium salt |
| Witcamide 5130 | Alkanolamine fatty acid condensate |

Such surfactants are usually used in amounts up to about 25 parts, preferably from 2 to about 10 parts, thereof per 100 parts of the resin-forming reaction mixture, by weight.

The catalyst and surfactant are advantageously mixed together before being added to the molten reaction mixture as described and thoroughly mixed in. The addition of catalyst stimulates further reaction and evolution of carbon dioxide; the reaction is continued and temperature is controlled, preferably between about 60° and about 80° C. When the evolution of carbon dioxide again subsides, the temperature of the reaction mixture is preferably brought within the range from about 50° to about 60° C, and water is added to the reaction mixture.

The amount of water added is from about 0.5 to about 1.2, preferably near to one, mole thereof per equivalent of starting polyisocyanate.

After addition of water, there is usually an induction period, followed by a further exothermic reaction and evolution of carbon dioxide. The temperature of the reaction mixture is maintained preferably below about 80° C. As the reaction again subsides and the mixture begins to harden, the material is allowed to cool and solidify.

It is usually preferred to remove the reaction mixture from the reaction vessel while the material is still hot, plastic and flowable, and to allow it to cool and solidify in the form of sheets, rods or chunks which can then be crushed, chopped, ground, pulverized or otherwise broken up into small pieces, granules or powder.

The resulting solid material is the storage-stable intermediate of this invention.

When it is desired to make therefrom a fully polymerized, thermoset resin foam, the granules or powder of solid intermediate are placed into a suitable mold and heated to effect foaming and to complete the polymerization reaction.

Suitable molds are ones which are capable of being heated to the required temperature (as described hereinafter) and from which the rigid resin foam shaped article can be removed after curing. Usually the mold is of metal, preferably coated with release material such as fused tetrafluoroethylene polymer resins. If substantially closed, the mold may be vented to allow escape of vaporized materials. Suitable molds provide means to at least partially form the foam into desired shape and include open molds where the resulting resin-foam has a free, unconfined upper surface.

The step for converting the foamable powder or granules into rigid resin foam products is carried out by heating the foamable material in the mold to foaming and resin polymerization temperature above about 150° C, preferably above 200° C up to about 300° C for time periods from about 5 minutes to about one hour. The material sinters and foams to a unitary cellular resin body. In general, the higher the temperature and longer the time of heating, the more fully imidized is the resulting cellular resin product. Typically, the foamable material is heated in its mold at 210–275° C for from 10 to 30 minutes. During this step, the ethylenic groups of the intermediate product polymerize forming crosslinked resin structures. At lower temperatures of such polymerization, many of the intermediate amic acid groups remain in the resulting resin product. At higher polymerization temperatures, most of the amic acid groups cyclize, forming cyclic imide groups in the resulting resin product, as shown in Formula I. At much higher polymerization temperatures in an open mold, the resin product loses weight, typically in the order of 15–25% of the foamable solid, by vaporization of water and other volatile materials from the foam. The resulting molded resin rigid foam product is then removed and allowed to cool. The resulting foamed resin product is usually beige to tan to black or nearly black in color, infusible, insoluble in usual solvents, and cannot be ignited with an ordinary gas flame in air. The apparent density of the resulting foamed resin product is usually from about 0.5 pcf (about 0.008 g/cc) to about 30 pcf (about 0.5 g/cc).

If desired, various fillers and fibrous materials, especially inorganic fillers, glass beads, microballons, glass fibers or carbon fibers, and other additives such as flame retardants can be added to the starting reaction mixture, or to the flowable reaction mixture before it solidifies, or to the foamable solid powder or granules of intermediate before the foaming and final resin polymerization step.

The cellular crosslinked resin foam products are formed into useful shapes and articles by foaming the foamable solid intermediate in suitably shaped molds as herein described. Fully polymerized resin foam bodies are also post-fabricated into useful objects by conventional means of cutting, sawing, drilling or other machining. Articles made from these foamed resins are useful as insulation and parts requiring low density and resistance to heat, such as building panels and walls of ovens and furnaces.

The following examples illustrate the invention but are not to be taken as limiting its scope. Parts and percentages are by weight unless otherwise indicated or required by the context. In the examples, the polymeric methylene-phenyl polyisocyanate is a commercial product sold by Mobay Chemical Company under Trademark name "Mondur MR".

EXAMPLE 1

Part 1

A mixture of 2.0 parts maleic acid, 5.6 parts maleic anhydride, and 13.4 parts methylene-di-p-phenyl-diisocyanate is prepared at room temperature and heated to 65° C in a stirred reactor. The mixture melts, and carbon dioxide is evolved. As the $CO_2$ evolution subsides, there is added to the reaction mixture with continued stirring a pre-combined mixture of 0.47 part 2-(8-heptadecenyl)-2-imidazoline-1-ethanol catalyst and 0.80 part DC-193 surfactant, a block copolymer of polysiloxane and polyalkylene oxide. More $CO_2$ is evolved and the molten reaction mixture changes color from yellow to red-orange to tan. When the gas evolution subsides and the color of the reaction mixture is tan, the mixture is cooled to 50° C and 2 parts of water is added with continued stirring. After an induction period, vigorous evolution of $CO_2$ resumes as an exothermic reaction takes place. The temperature of the reaction mixture is controlled below 80° C and stirring is continued. When the reaction mixture begins to harden, stirring is stopped, and the reaction mixture is taken from the reactor vessel and allowed to cool and solidify. Chunks of the solid material are conveniently ground to a fine powder having a yellow color.

Part 2

Portions of the resulting yellow powder solid are spread in a thin layer in flat aluminum pans and heated in an air oven at temperatures and for times indicated in Table I. The powder foams and sinters together into cellular rigid solid blocks having substantially closed cell structure composed of uniform small cells and having apparent density also shown in the Table.

Table I

| Test No. | Preheat Temp. | Preheat Time | Final Heat Temp. | Final Heat Time | Foam Density[1] |
|---|---|---|---|---|---|
| 1.1 | none | none | 275° C | 20 min. | 1.6 pcf |
| 1.2 | none | none | 250° C | 20 min. | 1.3 pcf |
| 1.3 | 190° C | 15 min. | 250° C | 10 min. | 1.94 pcf |

Note
[1]apparent density of cellular resin product in pounds per cubic foot.

The cellular resin products are evaluated as to their behavior when exposed to open flame. A strip of each foam is held in a horizontal position 1.5 inches above the top and in the flame of a standard Bunsen burner burning natural gas in air. The pieces char, but do not melt or drip, are not consumed by the flame, and generate very little smoke. Finally, the charred foam pieces glow in the gas flame; when the Bunsen flame is removed, the pieces cool and are found to have substantially retained their cellular structure and strength.

The intermediate yellow solid powder is storage-stable; it can be held indefinitely before heating as in Part 2 to effect foaming and sintering thereof with substantially similar results in making the cellular rigid solid blocks and other shapes.

EXAMPLE 2

Part 1

A storage-stable powdered solid resin intermediate material is prepared by repeating Part 1 of Example 1, except that the 2.0 parts of maleic acid is replaced by 1.79 parts of malonic acid.

Part 2

A portion of the resulting powdered solid material is spread on the bottom of a shallow flat aluminum pan and heated in an air oven, first for 20 minutes at 175° C and finally at 225° C for a further 30 minutes. The powder foams and sinters into a cellular rigid solid block having apparent density 2.19 pounds per cubic foot and uniform small cell structure, only 27% of which are open cells.

What is claimed is:

1. In a method of making crosslinked ethylenic polymer resin foams, the improvement which comprises making a storage-stable foamable solid intermediate by admixing and interacting in a reaction mixture at temperature above the melting point thereof but below about 100° C, at least one organic polyisocyanate, at least one dicarboxylic acid, and at least one ethylenically unsaturated dicarboxylic acid cyclic anhydride, allowing carbon dioxide to evolve from the reaction mixture, subsequently adding to the reaction mixture a pre-combined mixture of catalyst and surfactant, subsequently adding to the reaction mixture a small amount of water, maintaining the reaction mixture at temperature below about 100° C until the reaction mixture begins to harden, then cooling the reaction mixture to solid state.

2. The improvement according to claim 1 which includes the subsequent step of heating the foamable solid intermediate to foaming and polymerization temperature above about 150° C until a cellular polymerized resin product is obtained.

3. The improvement according to claim 1 wherein the polyisocyanate is polymethylene polyphenyl polyisocyanate.

4. The improvement according to claim 1 wherein the dicarboxylic acid is maleic acid.

5. The improvement according to claim 1 wherein the anhydride is maleic anhydride.

6. The improvement according to claim 1 wherein the proportions of reactants correspond to not more than about three equivalents of polyisocyanate per mole of anhydride and not more than about 0.5 mole of dicarboxylic acid per mole of anhydride, the catalyst is a tertiary amine catalyst in amount from about 0.1 to about 10% of the combined weight of such starting reactants, the amount of surfactant is from about 2 to about 10% of the combined weight of such starting reactants, and the amount of added water is from about 0.5 to about 1.2 moles thereof per equivalent of starting polyisocyanate.

7. The improvement according to claim 1 wherein the starting mixture of reactants consists essentially of at least one polymethylene polyphenyl polyisocyanate, maleic acid and maleic anhydride in proportions corresponding to from one to about two equivalents of polyisocyanate per mole of maleic anhydride and from about 0.05 to about 0.3 mole of maleic acid per mole of maleic anhydride, the catalyst is a tertiary amine catalyst in amount from about one to about five percent of the combined weight of the starting mixture of reactants, the amount of surfactant is from about two to about ten percent of the combined weight of the starting mixture of reactants, and the amount of added water is from about 0.5 to about 1.2 moles thereof per equivalent of the starting polyisocyanate.

8. The improvement according to claim 7 which includes the subsequent step of heating the foamable solid intermediate in finely divided form to foaming and resin-polymerizing temperature between about 200° and about 300° C until a cellular polymerized resin product is obtained.

9. The storage-stable foamable and polymerizable solid intermediate product of the method improvement of claim 1.

10. The storage-stable foamable and polymerizable solid intermediate product of the method improvement of claim 7.

* * * * *